United States Patent [19]
Khurgin

[11] Patent Number: 4,882,574
[45] Date of Patent: Nov. 21, 1989

[54] TWO-RESISTOR ICE DETECTOR

[76] Inventor: Boris Khurgin, 175 W. 87th St., New York, N.Y. 10024

[21] Appl. No.: 209,360

[22] Filed: Jun. 20, 1988

[51] Int. Cl.⁴ .............................................. G08B 21/00
[52] U.S. Cl. ...................................... 340/581; 340/580
[58] Field of Search ................................ 340/581, 580

[56] References Cited

U.S. PATENT DOCUMENTS

| | | | |
|---|---|---|---|
| 2,803,813 | 8/1957 | Bullen et al. | 340/580 |
| 3,164,820 | 1/1965 | Hullett | 340/581 |
| 3,305,851 | 2/1967 | Brandtszteter | 340/581 |
| 3,571,900 | 6/1970 | Roussel | 340/580 |
| 4,037,427 | 7/1977 | Kramer | 340/581 |
| 4,210,021 | 7/1980 | Vykhodtseu et al. | 340/580 |
| 4,333,004 | 6/1982 | Forgue et al. | 340/581 |
| 4,755,062 | 7/1988 | Meyer | 340/581 |

Primary Examiner—Glen R. Swann, III
Attorney, Agent, or Firm—James & Franklin

[57] ABSTRACT

An ice detector comprises first and second simultaneously electrically energized resistors one of which is in good thermal contact with the surface where the presence or absence of ice is to be detected and the other of which is thermally insulated from that surface. When ice is present on that surface there will be a different between the temperatures, and hence the resistances, of the two resistors, which difference, when sensed, indicates the existence of ice.

15 Claims, 1 Drawing Sheet

TWO-RESISTOR ICE DETECTOR

This invention relates to means for indicating the presence or absence of ice on a surface.

BACKGROUND OF THE INVENTION

There are many instances when it is important to know whether, or to what extent, ice has formed on a given surface. The presence of ice on the wings, control surfaces or fuselage of aircraft is known to be potentially life threatening, but there are many other instances (e.g., cooling towers, aerials, refrigerator elements, bridges and roadways and the like) where ice detection is also important. While various procapable of detecting ice formation and indicating when ice has formed to an impermissible degree, in general those prior art devices suffer from complexity, expensiveness and unreliability. In many instances they are also undesirable for use with aircraft because they normally project out from the aircraft surface where ice detection is to take place and therefore disturb the aerodynamic efficiency of the craft. For example, the device disclosed in Bullen et al. U.S. Pat. No. 2,803,813 of Aug. 20, 1957 utilizes an element which normally projects beyond the aircraft surface so that if icing conditions prevail ice can form on that object, as a result of which when the object is pulled back into the aircraft its retrograde motion will be impeded by the ice and thus will cause a part within the housing to move and actuate an alarm. In addition to the fact that the part must project out from the airplane for an appreciable period of time in order to give ice the opportunity to form on it if weather conditions are appropriate, the presence of foreign particles other than ice on the exterior of the object will cause false alarms, thus making it unreliable.

SUMMARY OF THE INVENTION

The ice detector of the present invention not only does not have any parts projecting from the aircraft surface at any time, thus never interfering with proper air flow over that surface, but has no moving parts at all. It is electrical in nature, and is positive in operation, not requiring reference voltages or stabilized currents. It is designed to indicate the presence or absence of ice periodically, at a time frequency appropriate to the external conditions. For example, tests may be made only upon command, or once a minute or once every ten minutes or, if the situation is potentially critical, once every fraction of a minute.

It is the prime object of the present invention to devise an ice detector which is inexpensive, positive and reliable in operation, and adaptable to many different requirements.

It is a further object of the present invention to devise such an ice detector which in no way interferes with the normal aerodynamic functioning of the aircraft in which it is installed.

It is yet another object of the present invention to devise such an ice detector which performs its act of detection quickly and positively and then resumes a standby condition, ready to perform its ice detection function at any desired later time.

It is a still further object of the present invention to devise an electrically energized ice detector which is inherently accurate and reliable, and which is not dependent upon precision in its electrical sources.

To these ends the ice detector of the present invention comprises a pair of resistors whose temperature-resistance characteristics are known and are preferably similar. One of those resistors is mounted so as to be in good thermal connection with the surface where ice is to be detected and the other of those resistors is mounted so as to be thermally insulated from that surface. During the detection cycle the two resistors are simultaneously electrically energized, and the passage of current therethrough will cause their temperatures to rise and that in turn will cause their resistance to increase. Since the first resistor is in good thermal conductivity with the surface in question, the presence of ice on that surface will cause the temperature of the first resistor to remain constant or to increase more slowly than if ice were not present on that surface, whereas the presence or absence of ice on that surface will have no effect on the rate of temperature increase, and hence the rate of resistance increase, of the second resistor. Thus if no ice is present the relationship between the resistances of the two resistors after they have been electrically energized for a predetermined period will be different than if ice is present on that surface. When the two resistors are initially of the same resistance and have the same temperature coefficient of resistivity, as is preferable, the resistances of the two resistors will remain the same if no ice is present but will differ if ice is present. The difference between the resistances of the two resistors is detected, and when that difference reaches a predetermined magnitude an appropriate alarm or indicator is actuated to indicate the presence of ice on the surface to be monitored. Detection of this resistance difference is greatly facilitated if the two resistors are connected in a bridge circuit with other resistors, this eliminating the need for any reference voltage sources and permitting the system to function accurately even though the source of electrical energy may not be constant.

BRIEF DESCRIPTION OF THE DRAWING

To the accomplishment of the above, and to such other objects as may hereinafter appear, the present invention relates to the construction and operation of an ice detector as defined in the appended claims and as described in this specification, taken together with the accompanying drawings, in which:

DISCLOSURE OF THE PREFERRED EMBODIMENTS

Figure 1:
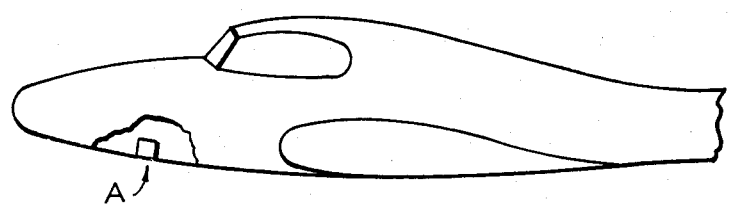
FIG. 1 is an idealized view showing one application for the ice detector of the present invention, to wit, to detect the presence of ice on the skin of an aircraft.

While I have here chosen to illustrate the device of the present invention as used to detect ice on the skin of an aircraft (the device generally designated A in FIG. 1 being mounted inside an aircraft adjacent to the skin thereof), that being a very important application for the detector of the present invention, it will be understood that is by way of illustration only, and that my ice detector can be used in many other environments where detection of the presence or absence of ice is called for.

Figure 2:
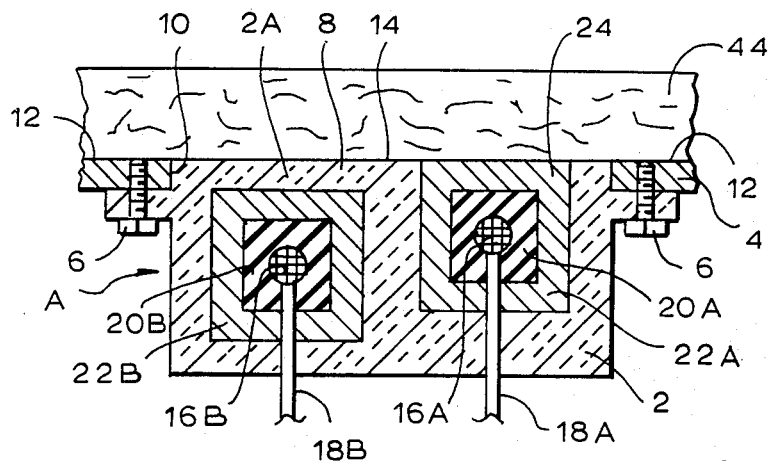
FIG. 2 is a cross-sectional view of a preferred embodiment of the present invention showing the device in place on the aircraft skin.

In FIG. 2, illustrating a preferred embodiment of the present invention, the ice detector A comprises a housing generally designated 2 secured to the inside of a mounting structure 4, such as the skin of an aircraft, by screws 6 so as to have its forward portion 8 extend snugly into an opening 10 in the skin of the structure 4. Preferably the forward surface 14 of the housing 2 will then be flush with the outer surface 12 of the skin 4, so that the detector in effect constitutes a continuation of the outer surface of the skin of the aircraft and therefore does not interfere at all with the aerodynamic functioning of the aircraft structure. The housing 2 is formed of any suitable structural material, but with at least a portion of that housing 2, and preferably the entire housing, being formed of a material which is a good thermal insulator. It may, for example, be comprised of asbestos together with some rigidifying impregnant if desired.

Mounted within the housing 2 are first and second electrical resistors 16A and 16B respectively, each having leads 18A and 18B respectively extending therefrom to the exterior of the housing 2. In the embodiment disclosed in FIG. 2 the resistors 16A and 16B are embedded in bodies 20A and 20B respectively formed of a material which is a good electrical insulator and which has a high thermal conductivity. One such material is that which is sold by Stockwell Rubber Company under the trademark "Coolsil", and which is currently used as a heat sink material in various electronics applications. The bodies 20A and 20B are surrounded by rigid bodies 22A and 22B respectively of good thermal conductivity, for instance, copper.

The first resistor 16A, with its associated surrounding bodies 20A and 22A, is mounted within a recess 24 in the housing 2 which is open at the surface 14, and the upper surface of the body 22A is preferably there exposed. As a result, because both of the bodies 20A and 22A are of high thermal conductivity, the resistor 16A will be in good thermal conduction with the surface 14. By way of contrast, the second resistor 16B, with its associated bodies 20B and 22B, is entirely encased within the housing 2, separated from the surface 14 by a portion 2A of the housing 2 of sufficient thickness, and with a sufficiently high thermal insulation characteristic, so that the resistor 16B is thermally insulated from, and is essentially not sensitive to thermal conditions at, the surface 14.

Figure 4:
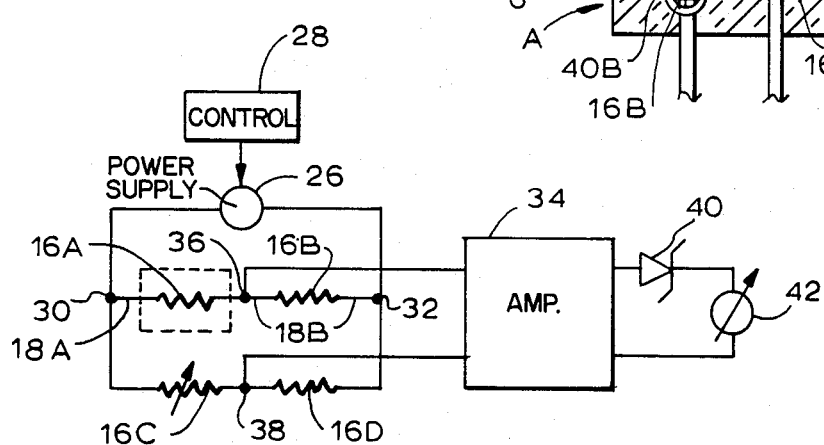
FIG. 4 is a circuit diagram of one way in which the ice detector of the present invention can be used.

FIG. 4 represents a preferred circuit arrangement for using the resistors 16A and 16B to detect the presence or absence of ice at the surfaces 12 and 14. Those two resistors, which are preferably the same in nominal resistance and with essentially the same temperature-resistance coefficient, are connected to one another and to two reference resistors 16C and 16D in the manner shown to form a typical Wheatstone bridge B, with resistors 16A and 16B being in series with one another and in parallel with series-connected resistors 16C and 16D. A power supply 26 controlled by a timer and/or manual control 28 is connected across bridge nodes 30 and 32, while an amplifier 34 is connected across bridge nodes 36 and 38, the nodes 36 and 38 being located between resistors 16A and 16B and resistors 16C and 16D respectively, while the nodes 30 and 32 are connected between resistors 16A and 16C and between resistors 16B and 16D respectively. The amplifier 34 is connected, preferably by means of Zener diode 40, to an alarm or indicator 42.

Figure 3:
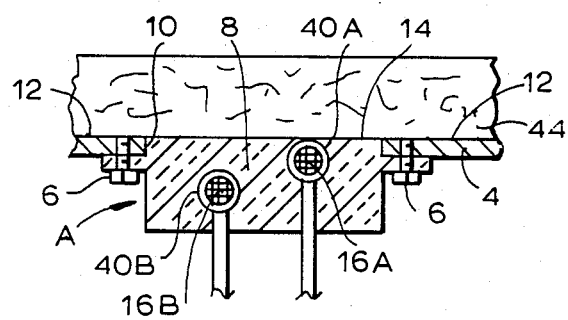
FIG. 3 is a view similar to FIG. 2 but of an alternative embodiment.

An alternative structural embodiment of the detector of the present invention is disclosed in FIG. 3. There each of the resistors 16A and 16B is covered by a thin layer 40A and 40B respectively of an electrical insulator, the layer being thin enough so as to place the resistors in good thermal connection with their surroundings. Typically the resistors may be made of nickel covered by an electroplated layer of copper of perhaps 0.001" thickness, with the outer surface of that copper then being oxidized to produce a layer of copper oxide, such as that known by the trade name "Melaconite". As will be apparent from FIG. 3, resistor 16A will therefore be in good thermal connection with the surface 14 while the resistor 16B will be thermally insulated therefrom.

Although the elements 16A and 16B have been here generically referred to as resistors, it is preferred that they be in the nature of electrical heating elements which, when electrically energized, produce a substantial amount of heat, to the end that when those elements are electrically energized the significant amounts of heat produced thereby will tend to cause their temperatures to increase relatively rapidly and, as is well known, when resistors increase in temperature their resistance increases. It is preferred that the elements be formed of material which has a relatively high temperature-resistivity coefficient, thereby to produce significant changes in resistance as the temperatures of the elements change.

The Zener diode 40 is provided to prevent actuation of the alarm or indicator 42 unless and until the output amplifier 34 reaches a predetermined value, thus minimizing the possibility of false alarm.

Since the two resistors may be at different temperatures under normal standby conditions—the air to which resistor 16A is exposed may be quite cold—and hence exhibit different resistances when energized, and since the bridge B must nevertheless be balanced in the absence of ice, the resistor 16C may be made adjustable to achieve that bridge balance under those ice-free conditions. When no ice 44 is present the temperatures of the two resistors will continue to present the same temperature difference even though both resistances change, so the bridge B will remain balanced, but if ice 44 is present the heat from resistor 16A will largely go toward melting that ice before the temperature of that resistor 16A can rise, and hence the temperature difference (and resistance difference) between the two resistors will increase, unbalancing the bridge B and actuating the alarm or indicator 42.

The adjustability of resistor 16C and/or 16D can also be used to advantage to compensate for any differences in resistance of resistors 16A and 16B when they are at the same temperature.

When the device of the present invention is to be used to detect the presence or absence of ice at the surfaces 12 and 14 the control or timer 28 will actuate the power source 26 and cause current to pass through the resistors 16A and 16B as well as resistors 16C and 16D. The passage of current through the resistors 16A and 16B will produce heat, causing the temperatures of those resistors to tend to rise. If there is no ice on the surface 14 the temperatures of the two resistors 16A and 16B will both rise at substantially the same rate, so that the resistances of the two resistors 16A and 16B will remain substantially the same. Since the bridge B was initially balanced, if the resistances of the resistors 16A and 16B remain the same the bridge B will remain balanced. There will be no output across the nodes 36 and 38, and hence the indicator 42 will not be actuated. On the other hand, if there is ice on the surface 14, as indicated in FIGS. 2 and 3 at 44, the resistor 16A which is in good thermal contact with that ice 44 will remain substantially at the temperature of the ice (0° C.) unless and until the heat from the resistor 16A melts that ice. However, the temperature of resistor 16B, thermally insulated from the ice 44, will rise. Hence there will be a difference between the temperatures of the two resistors 16A and 16B, that difference in resistance will unbalance the bridge B, there will be an output across the nodes 36 and 38, that output will be amplified by the amplifier 34, and the alarm or indicator 42 will be actuated.

Energization of the resistors 16A and 16B will continue, controlled by the timer 28, for a period of time sufficient to detect the presence or absence of the ice 44, after which energization of the resistors 16A and 16B will be interrupted and those resistors will be permitted to return to their normal temperature status, at which time the system will be ready for another ice detection cycle, as determined either by the timer 28 or by appropriate manual actuation.

If the duration of a given ice detection cycle is sufficiently limited in time, taking into account the heat-producing characteristics of the resistor 16A, no significant quantity of the ice 44 will be melted thereby, and the detector will thus function to determine the presence or absence of ice whether deposited before or after the time of initial actuation. However, if the ice detection cycle is continued for a long enough period so that the heat produced by the resistor 16A will melt the ice 44 on the surface 14, the next ice detection cycle will indicate whether or not any ice formed on the surface 14 after the preceding detection cycle.

It will be appreciated that a significant advantage of the disclosed ice detector is that neither a stabilized current nor a reference voltage is required, and that the method is very reliable since it is based on the inherent physical properties of the detector, which are constant and which do not depend upon the critical performance of electronic components.

While but a limited number of embodiments of the present invention have been here specifically disclosed, it will be apparent that many variations may be made therein, all within the scope of the present invention as defined in the following claims.

I claim:

1. An ice detector comprising first and second temperature-sensitive resistors, means for mounting said first resistor in good thermal conductivity with respect to a surface where the presence or absence of ice is to be detected, means for mounting said second resistor in good thermal insulation with respect to said surface, means for simultaneously electrically energizing said resistors, and means for detecting a difference in the resistance of said resistors after they have been energized and activating an indicator in response to a predetermined resistance difference, thereby indicating the presence of ice on said surface.

2. An ice detector comprising first and second temperature-sensitive resistors of substantially equal resistance, means for mounting said first resistor in good thermal conductivity with respect to a surface where the presence or absence of ice is to be detected, means for mounting said second resistor in good thermal insulation with respect to said surface, means for simultaneously electrically energizing said resistors substantially equally and means for detecting a difference in the resistance of said resistors after they have been energized and actuating an indicator in response to a predetermined resistance difference, thereby indicating the presence of ice on said surface.

3. The ice detector of either of claims 1 or 2, in which said resistors are electrically connected to one another and to other resistors to form a bridge circuit, said energizing means energizing said bridge, said detecting means being sensitive to the resistance of the elements of said bridge.

4. An ice detector comprising a housing having a surface where ice detection is to take place, first and second temperature-sensitive resistors mounted in said housing, said first resistor being so mounted as to be in good thermal conductivity with said surface, said second resistor being so mounted as to be thermally insulated from said surface, means for simultaneously electrically energizing said resistors, and means for detecting a difference in the resistance of said resistors after they have been energized and activating an indicator in response to a predetermined resistance difference, thereby indicting the presence of ice on said surface.

5. An ice detector comprising a housing having a surface where ice detection is to take place, first and second temperature-sensitive resistors of substantially equal resistance mounted in said housing, said first resistor being so mounted as to be in good thermal conductivity with said surface, said second resistor being so mounted as to be thermally insulated from said surface, means for simultaneously electrically energizing said resistors, and means for detecting a difference in the resistance of said resistors after they have been energized and activating an indicator in response to a predetermined resistance difference, thereby indicating the presence of ice on said surface.

6. The ice detector of either of claims 4 or 5, in which said resistors are electrically connected to one another and to other resistors to form a bridge circuit, said energizing means energizing said bridge, said detecting means being sensitive to the resistance of the elements of said bridge.

7. The ice detector of claim 6, in which said resistors are electrically connected to one another and to other resistors to form a bridge circuit, said energizing means energizing said bridge, said detecting means being sensitive to the resistance of the elements of said bridge.

8. The ice detector of claim 6, in which that portion of said housing defining said surface is of poor thermal conductivity, said first resistor being mounted in said portion so as to be thermally operatively exposed at said surface and said second resistor being located in said portion remote from and thermally insulated from said surface.

9. The ice detector of any of claims 1, 2, 4 or 5 in which at least said first resistor is substantially surrounded by a body of electrically insulating material of good thermal conductivity.

10. The ice detector of claim 9, in which said resistors are electrically connected to one another and to other resistors to form a bridge circuit, said energizing means energizing said bridge, said detecting means being sensitive to the resistance of the elements of said bridge.

11. The ice detector of any of claims 1, 2, 4 or 5 in which at least said first resistor is substantially surrounded by a body of electrically insulating material of good thermal conductivity which is in turn substantially surrounded by a substantially rigid body of good thermal conductivity.

12. The ice detector of claim 11, in which said resistors are electrically connected to one another and to other resistors to form a bridge circuit, said energizing means energizing said bridge, said detecting means being sensitive to the resistance of the elements of said bridge.

13. The ice detector of any of claims 1, 2, 4 or 5 in which at least said first resistor is surrounded by a layer of electrical insulation sufficiently thin as to place said resistor in good thermal conductivity with the outside of said layer.

14. The ice detector of claim 13, in which said resistors are electrically connected to one another and to other resistors to form a bridge circuit, said energizing means energizing said bridge, said detecting means being sensitive to the resistance of the elements of said bridge.

15. The ice detector of any of either of claims 4 or 5 in which that portion of said housing defining said surface is of poor thermal conductivity, said first resistor being mounted in said portion so as to be thermally operatively exposed at said surface and said second resistor being located in said portion remote from and thermally insulated from said surface.

* * * * *